US007766980B2

(12) United States Patent
Bögels et al.

(10) Patent No.: US 7,766,980 B2
(45) Date of Patent: Aug. 3, 2010

(54) METHOD FOR THE PREPARATION OF PRECIPITATES

(75) Inventors: Gertjan Bögels, Tilburg (NL); Jan Bastiaan Bouwstra, Bilthoven (NL); Huib Van Boxtel, Tilburg (NL)

(73) Assignee: Fujifilm Manufacturing Europe B.V., Tilburg (NL)

( * ) Notice: Subject to any disclaimer, the term of this patent is extended or adjusted under 35 U.S.C. 154(b) by 602 days.

(21) Appl. No.: 11/572,365

(22) PCT Filed: Jul. 19, 2005

(86) PCT No.: PCT/NL2005/000526

§ 371 (c)(1),
(2), (4) Date: Jan. 19, 2007

(87) PCT Pub. No.: WO2006/009441

PCT Pub. Date: Jan. 26, 2006

(65) Prior Publication Data

US 2008/0092340 A1 Apr. 24, 2008

(30) Foreign Application Priority Data

Jul. 21, 2004 (EP) .................................. 04077115

(51) Int. Cl.
*B01D 9/00* (2006.01)

(52) U.S. Cl. ...................................... 23/295 R; 23/300

(58) Field of Classification Search ............... 23/295 R, 23/300
See application file for complete search history.

(56) References Cited

U.S. PATENT DOCUMENTS 6,050,720 A 4/2000 Tuyuki

FOREIGN PATENT DOCUMENTS

EP 0 523 842 A1 1/1993
EP 1 357 423 A1 10/2003

*Primary Examiner*—Edward M Johnson
(74) *Attorney, Agent, or Firm*—Gilberto M. Villacorta; Sunit Talapatra; Foley & Lardner LLP

(57) ABSTRACT

The present invention concerns a method for the controlled precipitation of organic molecules which comprises the use of apparatus that is normally used in the field of photography.

11 Claims, 4 Drawing Sheets

METHOD FOR THE PREPARATION OF PRECIPITATES

FIELD OF THE INVENTION

The present invention is in the field of precipitation of substances. It relates generally to the technical field of methods for the controlled nucleation and growth of crystals, in particular crystallisation of non-silver halide substances. It concerns a method in which apparatus is used that is normally applied in the field of photography.

BACKGROUND OF THE INVENTION

Crystallization from solution is an important separation and purification process in the chemical process industries. It is the primary method for the production of a wide variety of materials ranging from inorganic compounds, such as calcium carbonate and soda ash, to high added value materials, such as pharmaceuticals and specialty chemicals. In addition to product purity, crystallization must also produce particles of the desired size and shape, as well as particles of the desired polymorph.

Chemicals have the ability to crystallize into more than one distinct crystal structure. This ability is called polymorphism (or, if the species is an element, allotropism). Different polymorphs of the same material can display significant changes in their properties, as well as in their structures. These properties include density, shape, vapor pressure, solubility, dissolution rate, bioavailability, and electrical conductivity. Polymorphism is quite common among the elements and also for inorganic and organic chemicals. It is especially prevalent in organic molecular crystals, which often possess multiple polymorphs. The incidence of polymorphism in organic molecular crystals bears great significance to the pharmaceutical, dye, agricultural; chemical, and explosives industries.

Under a given set of conditions, one polymorph exists as the thermodynamically stable form. This is not to say, however, that the other polymorphs cannot exist or form in these conditions. It means only that one polymorph is stable while the other polymorphs can transform to the stable form. In pharmaceutical product development, the most stable polymorph has, generally, been selected for employment in the final dosage product. Yet in recent years, metastable forms have often been utilized due to their enhanced dissolution and/or bioavailability. In these cases, an understanding of the stability of these metastable forms under processing and storage conditions has proven crucial for the safety and efficacy of the drug. Usually regulatory authorities regulate both the drug substance and the polymorph for all crystalline pharmaceuticals and require extensive studies of polymorph stability.

Crystallization from solution begins with the nucleation of crystals followed by the growth of these nuclei to finite size. Nucleation and growth follow separate kinetic regimes with nucleation normally occurring at high driving forces (oversaturation) and growth occurring at all levels of oversaturations. The growth rate is usually faster at increasing oversaturation levels. Beyond a critical oversaturation there will be spontaneous nucleation of new nuclei. If one wants to prevent such extra nucleation, one needs to keep the oversaturation below said critical oversaturation value during growth. The critical oversaturation needs to be determined for each precipitating compound and each precipitating condition(such as kind of solvent, temperature, etc.). A major problem with usual crystallization methods is that with substances that form organic molecular crystals it can be difficult to obtain high oversaturations. High oversaturation meaning a value (S) higher than for example 5; (S being defined as the actual concentration of a substance divide by the concentration when the substance in the particular solvent is just saturated). Another problem is that these methods can produce an undesired polymorph because of the inadequate levels of oversaturation used or the inhomogeneous distribution of the oversaturation throughout the reaction vessel In the field of photography methods and apparatus are known for the preparation of silver halide emulsions. A particular method for the preparation of photographic silver halide emulsions makes use of a nucleation chamber into which an aqueous solution of halide and an aqueous solution of silver salt are separately and simultaneously added. The nucleation chamber is positioned in a larger growth or ripening chamber in to which the silver halide nuclei are discharged to grow further into the desired silver halide crystals. Suitable apparatus for carrying out such a method for producing silver halide crystals are described in U.S. Pat. No. 4,289,733, EP 523842, EP 708362, EP 1357423, EP 0 709 723, U.S. Pat. No. 2003/0224308, U.S. Pat. No. 6,050,720 and U.S. Pat. NO. 5,202,226. In the field of silver halide emulsions for photography, polymorphism of silver halide crystals has never been an issue. The methods and apparatus cited above always dealt with the problem of obtaining silver halide emulsions with narrow crystal or silver halide grain size distributions.

U.S. Pat. No. 6,050,720 concerns apparatus for the preparation of photographic silver halide emulsions. In passing it is noted that the apparatus can be used for agitating and mixing various solutions.

EP 523842 discloses a method of producing gold and silver chalcogenides, hence gold and silver salts of sulfur, selenium, and tellurium. These salts are sparingly water-soluble. No other crystals than those that are sparingly soluble in water and in fact no other crystals than of the same type as silver halide crystals are disclosed and contemplated.

EP 1357423 concerns a method and apparatus for forming silver halide emulsions. It is described that also semiconductor particles can be formed. In fact only particles of group II elements and group VI elements, hence of the same type as silver halide crystals, are suggested.

SUMMARY OF THE INVENTION

The present inventors came to the surprising insight that apparatus that is normally used in the field of photography for the preparation of silver halide emulsions is also suitable for crystallizing other molecules. In particular the present inventors came to the surprising insight that such apparatus is suitable to control polymorphism of organic molecules. Also it was surprisingly found that such apparatus is suitable to control the size of crystals.

Thus in its broadest sense the invention relates to the use of apparatus known for the preparation of photographic silver halide emulsions for the controlled precipitation of organic molecules. In particular the invention concerns the use of any one of a precipitation apparatus as disclosed in U.S. Pat. No. 4,289,733, EP 523842, EP 708362, EP 1357423, EP 709723, U.S. Pat. No. 2003/0224308, U.S. Pat. No. 6,050,720 and U.S. Pat. No. 5,202,226 for the controlled precipitation of organic molecules.

The apparatus should be of the type that comprises a nucleation chamber that is positioned inside, and in open connection with, a larger container or vessel. Further it is essential that in the nucleation chamber an oversaturated solution of the substance that is to be precipitated is formed or introduced in order to allow the formation of precipitated nuclei of the organic molecules under essentially homogeneous oversaturation conditions. Essentially in this context means, that the variation in oversaturation throughout the nucleation chamber is less than 20% preferably less than 10% and most preferably less than 5%. After formation of the nuclei with the desired polymorphism these are discharged into the vessel.

Thus in particular the invention concerns a method for the controlled precipitation of an organic molecule, said method comprising providing an oversaturated solution of the organic molecule to be precipitated in a nucleation chamber, said nucleation chamber, which is provided with agitation means, being positioned inside, and in open connection with a vessel and in which method there is a constant oversaturation of the solution in the nucleation chamber during the formation of nuclei and from which nucleation chamber after a predetermined period of time the formed nuclei are discharged into the vessel.

The main advantage of the method of the invention is that as a consequence of the constantly present oversaturation, one is able to set conditions such that only one polymorph-type is formed and not a mixture of polymorph-types as is usually the case in common crystallisation techniques where there is not constantly an over- or supersaturation. Another advantage of this technology is that crystals can be produced with a smaller average size and narrower size distribution than is the case with common crystallisation techniques. Thus the result of the present invention is that pure polymorph-types can be produced, but also crystals with desired average sizes and narrow size distributions.

DETAILED DESCRIPTION OF THE INVENTION

Figure 1A:
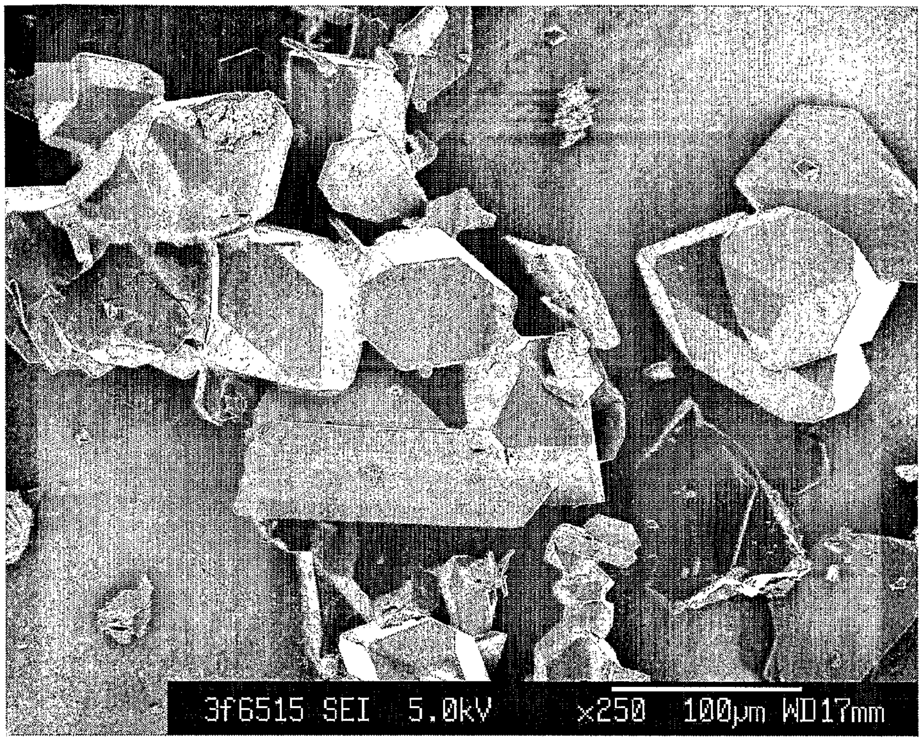
FIG. 1*a* shows both polymorphs of L-glutamic acid obtained in a comparative method.

The term 'organic molecules' in its broadest sense refers to molecules containing carbon atoms, in particular carbon containing compounds produced by living cells as well as carbon containing compounds that are synthesized artificially. Usually an organic molecule also contains hydrogen atoms. Very often organic molecules also contain oxygen and/or nitrogen atoms and to a lesser extent sulphur atoms. In particular the term 'organic molecules' refers what is normally considered an organic compound in the field of pharmaceutical, dye, agricultural and chemical industry. This includes 'biological' organic (bio-organic) compounds such as hormones proteins and the like. Hereinbelow organic molecule(s) is also referred to as substance(s).

The definition of 'polymorphism' is that when a substance can exist in more than one crystal structure or form it is said to exhibit polymorphism.

For a compound that has more than one polymorph a distinction can be made between types of polymorphs. One of the polymorphs is the thermodynamically stable form. Those crystals have a higher formation barrier and are therefore, formed in relatively slow processes of nucleation and growth. Another type is the kinetically stable form. These crystals are preferably formed in fast processes of nucleation and growth, but can transform during the crystallization process into the thermodynamically stable form. This phenomenon is known as Ostwald's rule of stages.

The term 'precipitation' refers to a subclass of the field of solution crystallisation. Precipitation is recognised by one or more of the following characteristics: (i) low solubility of the crystallising compound, (ii) fast process, (iii) small crystal size and (iv) irreversibility of the process (W. Gerhartz in: Ullhmans encyclopedia of Industrial Chemistry, vol. B2 5$^{th}$ ed., VHC Verlagsgessellschaft mbH, Weinheim, FGR, 1988). In the context of this invention a suitable definition for precipitation is the relatively rapid formation of a sparingly soluble solid phase from a liquid solution phase (Handbook of Industrial crystallization, Edit by Allan S. Myerson, Butterworth Heinemann, Oxford, p141).

Generally two types of processes resulting in precipitation can be discerned:

- A first type of process is anti-solvent (also referred to as non-solvent) precipitation. A dissolved substance is mixed with a solvent that lowers its solubility so that a precipitate will form. A modification of the anti-solvent precipitation is that a dissolved substance is not necessarily mixed with an anti-solvent but is mixed in such way that the solubility of the precipitating solvent is lowered such that nuclei are formed. This can be realised by variations in for example temperature, pH (addition of acid or alkaline solutions), ionic strength and the like and combinations of such factors,
- A second type of process is reaction precipitation. Two components are mixed resulting in the formation of a newly formed substance and due to the low solubility of the formed substance under the used mixing or reaction conditions a precipitate will form.

With the term 'oversaturation' is meant a concentration of a substance that is in excess of saturation under the given conditions, i.e. solvent or solvent mixture, temperature, pH, ionic strength etc. In the art 'oversaturation' is also referred to as 'supersaturation'.

An oversaturated solution of the substance(s) to be precipitated is brought about in a nucleation chamber. The nucleation chamber is provided with agitation means, in particular stirring means, preferably providing a lateral flow and a horizontal flow. Preferably the stirring means can be controlled. Preferably nucleation chamber and/or vessel are provided with temperature control means. The nucleation chamber is positioned inside, and in open connection with a vessel. The position of the nucleation chamber can be anywhere in the vessel as long as there is an open connection, outlet, of the mixing chamber with the vessel. Preferably the nucleation chamber is below the solvent surface in the vessel. Also preferably the nucleation chamber is in the lateral middle of the vessel where the vertical position can be varied from bottom till just below the solvent surface. This means that prior to precipitation in the nucleation chamber and in the vessel the same solvent is present. Via one or more inlets the substance to be precipitated, or components that form a substance to be precipitated, is introduced into the nucleation chamber resulting in a net outflow from the nucleation chamber into the vessel. Two, three, four or even more inlets may be present.

In a preferred embodiment all parts of the nucleation apparatus that are in contact with the oversaturated solutions, or with the bulk solution containing the crystals, are coated with a layer of a material that prevents adhering, fouling, incrustation and such. For example, the inner wall of the vessel and all parts of the agitator and nucleation chambers in contact with the solution are coated with for example teflon. In general coating material having a low surface tension can be advantageously used.

If necessary the apparatus can be equipped with scrapers or ultrasonic devices to prevent or minimize the effect of processes such as caking or incrustation as are known in the art.

In one embodiment of the method of the invention a substance to be precipitated is introduced into the nucleation chamber through one or more inlets. In a further embodiment at the same time separately a non-solvent for the substance to be precipitated is introduced into the nucleation chamber.

The precipitate can thus also be formed by the simultaneous addition of a solution of the substance to be precipitated and a non-solvent in the nucleation chamber. Preferably the solution that is present in the vessel and mixing chamber at the start of the precipitation process is a mixture of the used solvent and non-solvent. In some specific embodiments it can be advantageous that the solution that is present in the vessel and mixing chamber at the start of the precipitation process is saturated with the substance to be precipitated. The ratio of solvent to non-solvent which is used depends on the solvent and non solvent used, substance to be crystallised and the polymorph one likes to obtain. An important factor is the amount of oversaturation. Oversaturation (S) in this respect is defined as the actual concentration divided by the equilibrium concentration, meaning the concentration where the solution is just saturated. Depending on the molecule to be crystallised oversaturation levels S of more than 2, even more than 5 and for some molecules as high as 10 and even more can be advantageous. For some (inorganic) substances even oversaturation levels S of 100 or more can be used.

In yet another embodiment of the method of the invention the substance to be precipitated is formed in the nucleation chamber. In a particular embodiment the substance to be precipitated is formed by reaction from two or more components. More specific the substance to be precipitated is formed by a substantially instantaneous chemical reaction involving the formation of covalent and/or ionic bonds or by protonation/deprotonation or by anion/cation exchange or by acid addition salt formation/liberation, or through a combination of these reactions The volumes of nucleation chamber and vessel are those commonly applied in the art for the preparation of photographic silver halide emulsions and may vary from smaller than 1 liter, to several liters to more than 1000 liters. A suitable chamber/vessel ratio of volumes may vary for instance from 0.001 to 0.1.

The combination of nucleation chamber size incoming flow into the nucleation chamber and agitation intensity is chosen such, that the estimated residence time of each part of the incoming flow is in the range from 0.01 to 5 seconds, preferably within 0.1 to 2 seconds. The size of the nucleation chamber depends Very much on the scale one wants to perform the crystallisation. On small scale (1-5 $dm^3$ vessel) one typically would use a nucleation chamber of 10-150 $cm^3$, for medium scale (5-500 $dm^3$):150-500 $cm^3$), and for large scale (500-5000 $dm^3$): 500-5000 $cm^3$. For large scale, also nucleation chambers of a size higher than 5000 $cm^3$ can be used, even a size as high as 10000 cm3 is possible. The flow into the nucleation chamber can be adjusted and preferably agitation in the nucleation chamber can be adjusted so that nucleation time can be varied. The conditions are selected such that oversaturation is established in the nucleation chamber as a result of which nucleation takes place in the nucleation chamber. By the particular velocity of the flow into the nucleation chamber and the particular flow out of the nucleation chamber a homogeneous state of oversaturation is established in the nucleation chamber. This ensures that all nuclei that are formed are of the same type or polymorph.

Nucleation may occur quickly so that flow and agitation are set such that within a short time, for instance 200 milliseconds, precipitated nuclei can be discharged into the vessel via the open connection. If nucleation occurs slowly the flow and agitation can be set such that it takes several seconds, for instance at most 5 seconds preferably at most 3 seconds, before precipitated nuclei are discharged into the vessel. For instance for an apparatus, which comprises a nucleation chamber within a vessel, with a total volume of 3 liters, flow into the nucleation chamber may vary from 1 to more than 100 ml/min. In case of a total volume of 1200 liters, suitable flows are 0.5 l/min to 45.0 l/min.

During nucleation it is important that there is a constant oversaturation in the nucleation chamber. Preferably the oversaturation is constant at every location in the nucleation chamber. This is provided by agitation means, in particular stirring- or mixing means, in the nucleation chamber. The agitation means is preferably such that mixing of the flow(s) into the nucleation chamber results in an essentially homogeneous state of oversaturation of the substance to be precipitated. Preferably a nucleation chamber is equipped with two mixers, such as for instance disclosed in U.S. Pat. No. 6,050, 720, which apparatus is also used in the examples. The first mixer ensures rapid, perfectly mixed, constant oversaturation in the nucleation chamber. The second mixer transports the volume of the mixing chamber into the vessel. If the mixing speed is too slow inadequate mixing of the nucleation chamber occurs and no essentially homogenous state of oversaturation is established. Too fast mixing results in nuclei formation outside the nucleation chamber, where there is not constantly a state of oversaturation. Typical mixing (stirring) speeds are between 100-1300 rpm (rotations per minute). From the above explanation it is clear, that the design of the nucleation chamber can be varied. The important factors, which have to be taken into account are:

1. the amount or value (S) of oversaturation used,
2. the nucleation time, which is the time that a nucleus might reside in the nucleation chamber. By the proper selection of addition flows and stirring speeds and size of the stirrer blades, this time can be adjusted.

Generally, and unexpectedly, keeping the amount of oversaturation and the nucleation time the same, a smaller chamber volume will result in smaller crystal sizes. This is of particular interest in cases where conventional crystallisation processes lead to relatively large crystal or particle sizes. For example in pharmaceutical applications large crystal sizes are often unwanted as this complicates further formulation, e.g. requires an additional grinding or milling step to breakdown particles and reduce their size for accurate formulation in appropriate dosage forms. Thus in a further embodiment the invention relates to a method as described above for the control of the size of a substance to be precipitated. In particular the invention concerns a method to reduce the size of crystals compared to an initial size by applying the method of the invention. The initial size is for instance the size obtained from conventional crystallisation.

Also the invention concerns a method to reduce the size of crystals compared to an initial size by applying a nucleation chamber in the method of the invention which is reduced in size compared to said initial situation. Alternatively the invention concerns a method to increase the size of crystals compared to an initial size by applying a nucleation chamber in the method of the invention which is increased in size compared to said initial situation. In yet a further embodiment the invention relates to a method as described above for the control of the size distribution of a substance to be precipitated.

In one embodiment the mixer blades are made of a soft polymeric material. Soft agitator blades may reduce damage of crystals. In another embodiment the mixer blades are made of stainless steel, optionally all stainless steel submerged surfaces (including the blades) are coated with material that prevents adhering, fouling, incrustation such as for example teflon, more in general substances providing a low surface tension Preferably the nucleation chamber and/or vessel is provided with temperature control means, which allows the content of nucleation chamber and/or vessel to be kept at a constant value. By setting the temperature at appropriate values control of thermodynamic and kinetic forms of polymorphs is achieved and also provides control of particle size and size distribution.

When introducing the substance to be precipitated, or components that form a substance to be precipitated, into the nucleation chamber and vessel, the temperature difference may be at least 10 degrees, or 20 degrees or 30 degrees or 40 degrees or 50 degrees or even as high as 60 degrees or more. The temperature of the substance to be precipitated, or components that form a substance to be precipitated, is mostly higher than that in the nucleation chamber/vessel. Owing to the open contact of the nucleation chamber with the rest of the vessel it is difficult to apply a temperature difference between the nucleation chamber and the rest of the vessel. However, when conditions are chosen well, one is able to generate a lower temperature in the mixing chamber compared to the vessel. When adding a significant amount of a very cold non-solvent and a warm solution of the substance to be precipitated in its solvent into the starting solution in the nucleation chamber at ambient temperature, it is possible to get the temperature in the mixing chamber lower than the temperature outside said mixing chamber during the time of this addition. The lower temperature in the mixing chamber will lower the solubility of the substance to be precipitated and thus increase the oversaturation in the mixing chamber even more than if the temperatures of all solutions would be identical.

Depending on the type, average size and size distribution of desired crystals and/or polymorph the skilled person can select the conditions such as temperature, pH, (anti-)solvent (s), ionic strength, addition flow of the of the substance(s) to be precipitated, concentration of the substance(s) to be precipitated, agitation speed, agitation direction, size of the mixing chamber etc., under which oversaturation is established in the nucleation chamber. For example conditions that favor high oversaturation are low temperature, high addition flow, low agitation speed, small size mixing chamber. For example conditions that favor low oversaturation are high agitation speed, low addition flow, high temperature and large size mixing chamber.

In general the nuclei that are formed in the nucleation chamber will have the desired polymorphism as a result of the conditions under which oversaturation is established. The precipitate formed is discharged into the vessel from which it can be harvested once a suitable amount of precipitate is formed.

To improve the size of the precipitated nuclei, keeping the size distribution narrow, optionally the nucleation step may be followed by a growth stage. Nuclei of desired polymorphism have been formed and have been discharged into the vessel. In order to increase the size of the desired crystals the nuclei are allowed to grow in the vessel. Usually it suffices to add the substances(s) to be crystallised at slower rates so that renucleation is prevented. A suitable measure to influence the growth stage is by varying the temperature of the content of the vessel. Another means of growing the crystals to larger sizes without renucleation is by means of adding very small particles into the vessel. These very fine particles should be much smaller in size than the original precipitated crystals. The very fine particles have a larger solubility than the larger originally present particles. The smaller particles will dissolve and create a relatively mild oversaturation which will cause the original particles to grow without renucleation in the mixing chamber or vessel.

This effect of size on the solubility, also known as Ostwald ripening, is given by the following well-known Gibbs-Thomson equation:

$$\ln\frac{c(r)}{c^*} = \frac{\beta\Omega_0\sigma_s}{rkT} \quad \text{(Eq. 1)}$$

Here c(r) is the solubility of a particle with size r, c* the equilibrium solubility, β0 a surface shape factor, r the particle radius, $\sigma_s$ the specific interfacial energy of the solid particles in the solution and $\Omega_0$ is the molar volume of the substance to be precipitated.

Another improvement of the size and also in the size distribution of the precipitated nuclei is by optionally including a ripening stage. Nuclei of desired polymorphism have been formed and have been discharged into the vessel. During ripening no substance(s) are introduced into the nucleation camber. Temperature and agitation are selected such that smaller crystal will dissolve and larger desired crystals remain (Ostwald ripening). Temperature and agitation may be kept constant or may be varied.

Thus in a further embodiment the method of the invention comprises a growth stage. In another embodiment the method of the invention comprises a ripening stage. In yet another embodiment the method of the invention comprises a ripening stage and a growth stage.

In particular the method of the invention further comprises a growth stage in which the substance(s) to be precipitated is added at a slower rate than during the nucleation step. Also the method of the invention comprises a growth stage in which pre-nucleated nuclei, very much smaller than the originally formed ones, are discharged into the vessel and cause the original particles to grow without the occurrence of further nucleation. Also the method of the invention further comprises a ripening stage in which no substance(s) to be precipitated is added and time is given for Ostwald ripening to occur. Also a combination of a period of time of a slower rate of addition of the substance to be precipitated than during the nucleation step and a period of time of no addition of the substance to be precipitated is an embodiment of this invention.

Besides control of polymorphism the present invention allows the control of the morphology of and the average size and size distribution of the crystals formed. In particular for catalysts the morphology of the surface of the catalyst is of great importance for its catalytic activity. Thus in a further embodiment the invention relates to a method as described above for the control of the morphology of a substance to be precipitated.

Referring to the two types of processes resulting in precipitation described above an example of a precipitation process of the anti-solvent type is as follows: a dissolved substance to be crystallized is injected into the nucleation chamber. In the nucleation chamber and vessel the anti solvent is present; therefore, a precipitate will form. It is also possible that a mixture of both solvents is present (solvent and anti-solvent) in nucleation chamber and vessel. During nucleation the solvent with the crystallizing substance and anti-solvent are added simultaneously. When crystallizing organic or biochemical molecules with the solvent precipitation method, the bulk volume that is present before starting the crystallisation is a mixture of solvent and anti-solvent. When the solubility of the substance to be crystallised in the solvent mixture is too low, there is a risk that incrustation occurs. This can be prevented by coating parts, preferably all parts of the crystallisation apparatus that are in contact with the solutions with a layer of material that reduces or prevents incrustation. Examples of such materials are teflon, PVDF and the like. The value of ‘a’ and the choice of coating material varies with the types of solvent/anti-solvent and the substance that is crystallized.

An alternative is that anti-solvent is the same solvent as used to dissolve the crystallizing compound only at another pH, temperature etc. An example of this is the precipitation reaction of sodium L-glutamate. This dissolves well in water at pH 7, however, if this solution is injected in the mixing chamber in combination with injection of an aqueous acidic solution, with an aqueous starting solution to make the resulting pH=3.22, a precipitate of L-glutamic acid will form (at pH=3.22 it is sparingly soluble). This type of precipitation can occur via one inlet (solution of sodium L-glutamic acid injected into a solution to make pH=3.22) or via two inlets (solutions of sodium L-Glutamate+acid solution added simultaneously).

Reaction precipitation is illustrated in a simple form as follows: two (or more) soluble compounds, for example A(aq) and B(aq), are introduced simultaneously and separately into the nucleation chamber. Owing to the low solubility of the reaction product of A and B a precipitate will be formed. Reaction: $A(aq)+B(aq)\rightarrow AB(s)$.

Incrustation and other undesired phenomena can be avoided by coating the equipment with teflon or an other appropriate material.

Harvesting of the formed crystals from the vessel occurs according to methods known per se in the art and may include decantation, one or more washing steps, filtration, centrifugation, drying and combinations of these steps.

Analytical techniques for studying and characterizing polymorphs and morphology include X-ray crystallography, Raman spectroscopy, infrared spectroscopy, solid state nuclear magnetic resonance (SSNMR), scanning electron microscopy, atomic force microscopy (AFM), scanning tunnelling microscopy (STM) and/or density measurements.

Average particle size and particle size distribution can be measured with population analysis of Scanning Electron Microscope photographs and Laser Diffraction measurement techniques.

EXAMPLES

Introduction:

L-Glutamic acid is produced by adding simultaneously solutions of L-Glutamic acid monosodium salt and sulphuric acid at a pH around 3.22. At pH=3.22 the solubility of L-Glutamic acid is the lowest, therefore this is the pH at which the highest oversaturation can be obtained to form crystals.

L-Glutamic acid has two types polymorphs; the α-type (prismatic crystals) and the γ-type (plate or needle likes crystals). The α-type is the metastable form and the γ-type the thermodynamically stable form.

Example 1

Comparative

An L-Glutamic acid crystal suspension was prepared as follows:

A stirred reaction vessel of 4 L contained a solution of 1500 ml purified water, 33.68 g of L-Glutamic acid monosodium salt monohydrate. The pH of the solution was adjusted to 3.22 with a 4.9% sulfuric acid solution and the temperature of the mixture was maintained at 30° C. To this solution a 1.50 molar L-Glutamic acid monosodium salt monohydrate solution and a 4.9% solution of sulfuric acid solutions were added at addition rates of 25 ml/min and 31.2 ml/min respectively. No mixing chamber was present in this experiment. The flows were chosen such that the pH in the vessel was kept constant at 3.22. After the addition the temperature was kept constant at 30° C. for 30 minutes, to ripen the crystal further.

The grains were filtered and dried overnight at room temperature.

Example 2

Inventive

L-Glutamic acid grains were prepared as in example 1, except that during the addition of the reactant a rectangular parallelopipedum shape nucleation chamber of 240 ml with a square surface was used. Both reactants were added at the opposite sides of the lower part of the mixing chamber, below the agitator. An agitator was placed inside the mixing chamber providing both a lateral flow and an upward axial flow. The agitator speed was determined by trial and error using the above conditions. Particle size distribution was determined for varying flows. The optimum flow is found at the speed where the size distribution is smallest.

When varying the position and /or dimensions of the nucleation chamber such a series of experiments need to be repeated as is customary in the art.

Crystal shape was determined by scanning electron microscopy.

Results

Figure 1B:
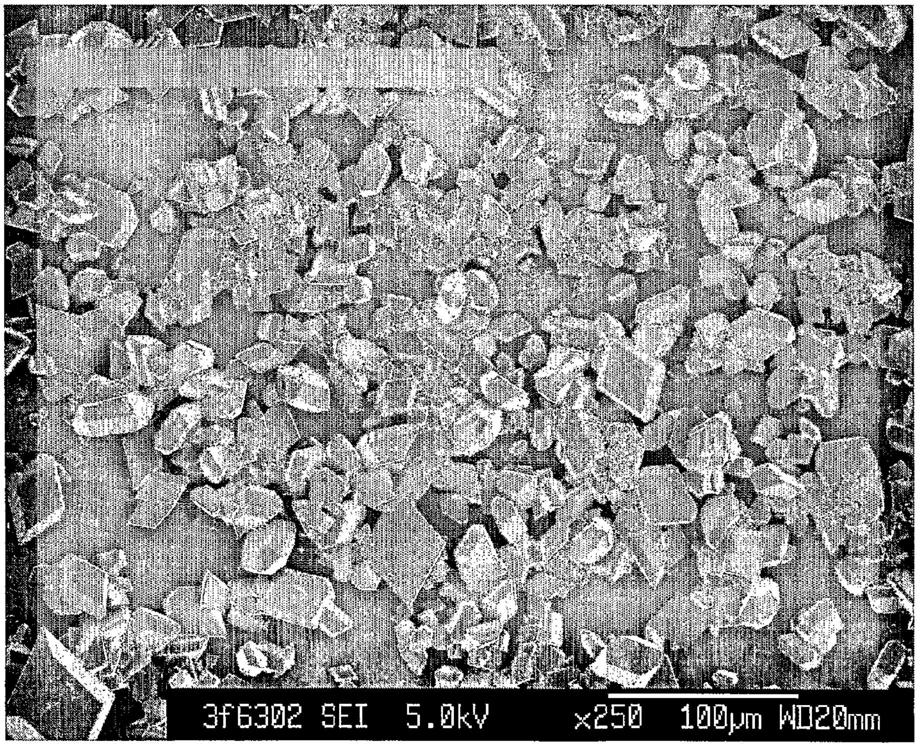
FIG. 1*b* shows the metastable α-type (prismatic crystals) form of L-glutamic acid obtained by the inventive method.

In experiment 1 (without mixing chamber) both type of crystals are formed (see FIG. 1*a*), whereas in experiment 2 (with nucleation chamber) only the α-type appears (FIG. 1*b*). The different crystal sizes can be explained that in the nucleation chamber the reactant are mixed better together so that more grains are formed. In experiment 2 the size of the crystals can be adjusted by varying the addition times.

Example 3

Comparative

A stirred reaction vessel of 4 L contained a solution of 1500 ml purified water, 33.68 g of L-Glutamic acid monosodium salt monohydrate. The pH of the solution was adjusted to 4.00 with a 4.9% sulfuric acid solution and the temperature of the mixture was maintained at 45° C. To this solution a 1.50 molar L-Glutamic acid monosodium salt monohydrate solution and a 4.9% solution of sulfuric acid were added at addition rates of 25 ml/min and 23.0 ml/min. No mixing chamber was present in this experiment. The flows were chosen such that the pH in the vessel was kept constant at 4.00. After the addition the temperature was decreased to 30° C. in 60 minutes to ripen the crystal further.

The grains were filtered and dried overnight at room temperature.

Example 4

Inventive

L-Glutamic acid grains were prepared as in example 3, except that during the addition of the reactant a nucleation chamber as in example 2 was used. Both reactants were added at the opposite sides of the lower part of the mixing chamber, below the agitator.

An agitator was placed inside the mixing chamber providing both a lateral flow and an upward axial flow. Agitator speed was determined as described in example 2.

Crystal shape was determined by scanning electron microscopy

Results

Figure 2A:
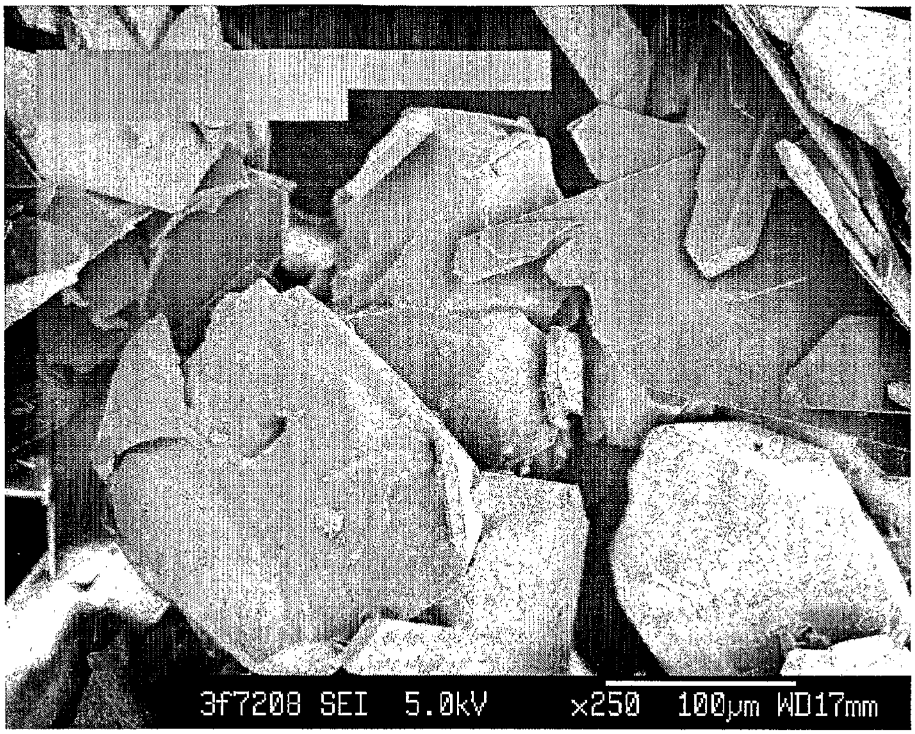
FIG. 2*a* shows both polymorphs of L-glutamic acid obtained in a comparative method.
Figure 2B:
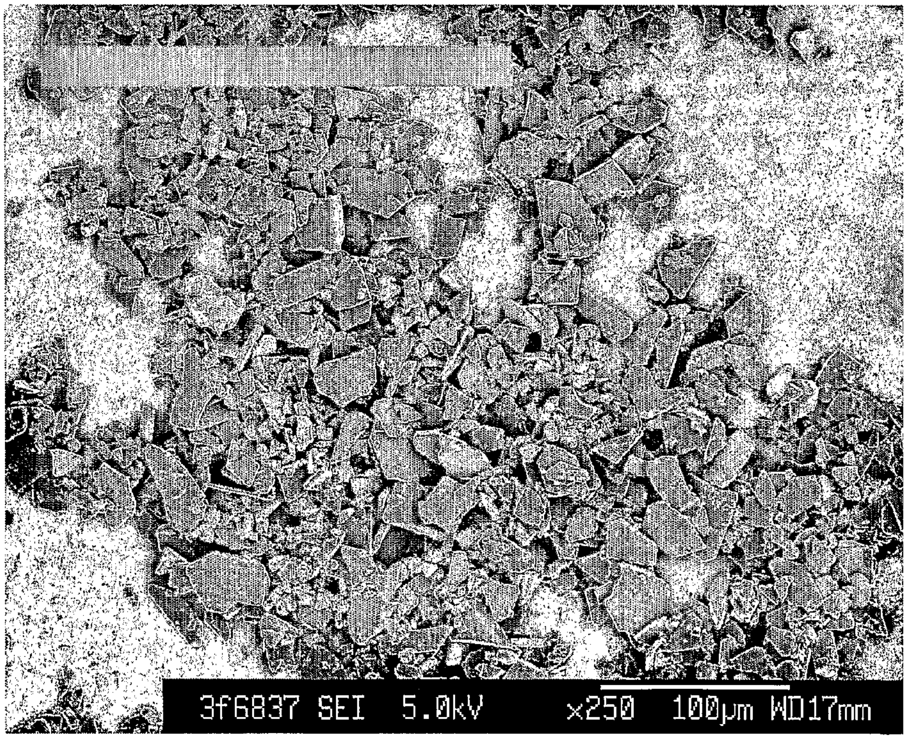
FIG. 2*b* shows the metastable α-type (prismatic crystals) form of L-glutamic acid obtained by the inventive method.

In experiment 3 (without nucleation chamber) both types of crystals are formed (see FIG. 2*a*), whereas in experiment 3 (with nucleation chamber) only the β-type appears (FIG. 2*b*).

Example 5

Comparative

A stirred reaction vessel of 4 L contained a solution of 810 ml n-heptane and 90 ml ethanol. The temperature of the mixture was maintained at 25° C. To this solution a 130 g/l paracetamol solution in ethanol and a solution of pure n-heptane were added at addition rates of 25.0 ml/min and 100.0 ml/min respectively. No mixing chamber was present in this experiment. After the addition the temperature was maintained at 25° C. for 15 minutes to ripen the crystals further.

Figure 3:
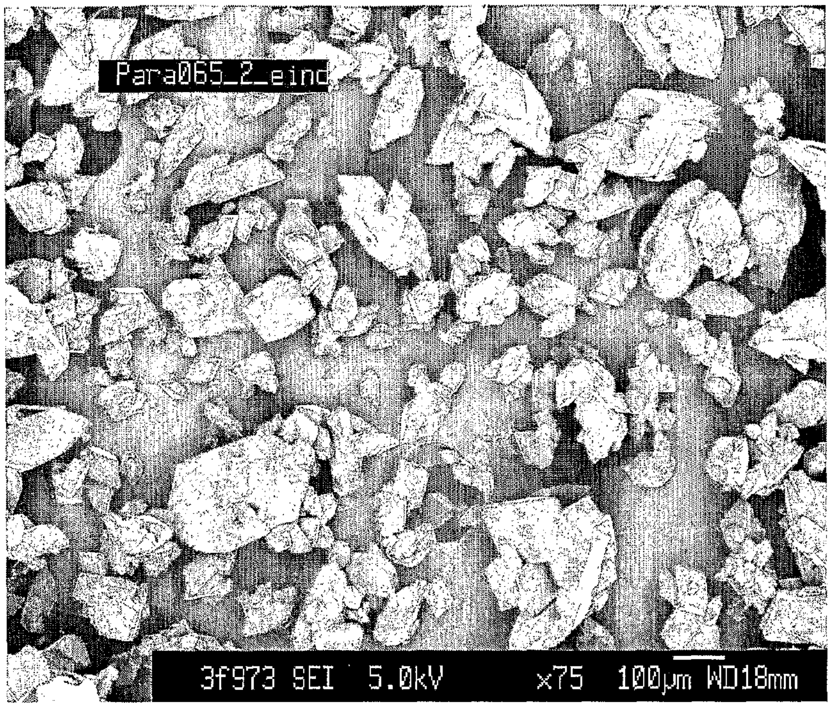
FIG. 3 shows crystals of paracetamol of various sizes in a broad size distribution obtained in a comparative method.

The grains were filtered, washed with n-heptane and dried overnight at room temperature. FIG. 3 shows crystals of various sizes in a broad size distribution.

Example 6

Inventive

Figure 4:
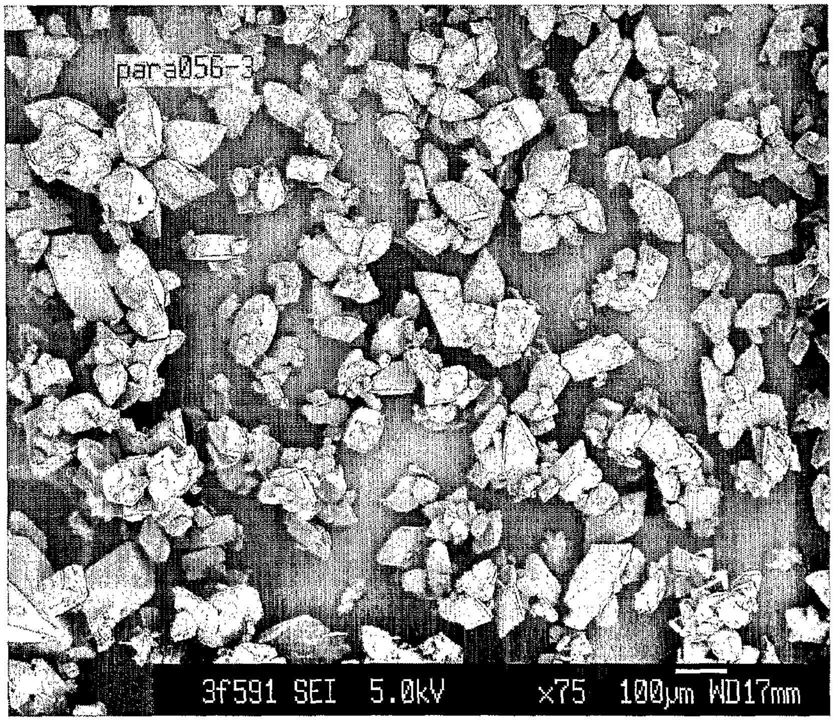
FIG. 4 shows crystals of paracetamol having a narrow size distribution obtained by the inventive method.

Paracetamol grains were prepared as in example 5, except that during the addition of the reactant a nucleation chamber with a volume of 144 $cm^3$ was used. The residence time was 0.28 seconds. Both reactants were added at the opposite sides of the lower part of the mixing chamber, below the agitator. An agitator was placed inside the mixing chamber providing both a lateral flow and an upward axial flow. Agitator speed was determined as described in example 2. FIG. 4 shows the crystals obtained. Compared to example 5 clearly there are more smaller crystals in a more narrow size distribution.

Example 7

Inventive

Figure 5:
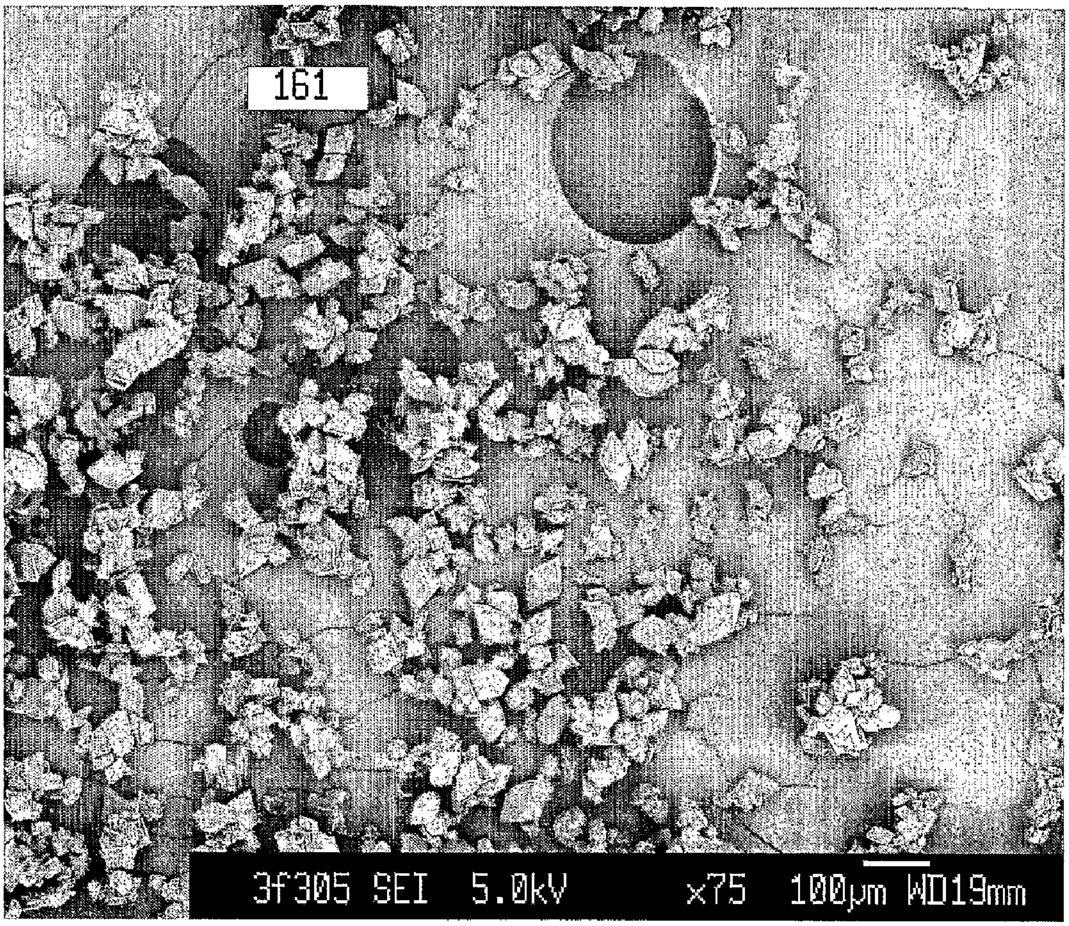
FIG. 5 shows more crystals of paracetamol having a narrow size distribution obtained by the inventive method.

Paracetamol grains were prepared as in example 6, except that the volume of the mixing chamber was ⅙-th of the volume of the mixing chamber used in the other examples. The residence time was the same as in inventive example 6. FIG. 5 shows the crystals obtained. Compared to example 6 much smaller crystals were obtained in an even more narrow size distribution. Comparing examples 6 and 7 it can be concluded, that in case one is pursuing to manufacture small crystals with a narrow particle size distribution, one should use relatively small nucleation chambers.

The invention claimed is:

1. A method for the controlled precipitation of an organic molecule from an oversaturated solution, the method comprising:

(a) providing an oversaturated solution of the organic molecule to be precipitated;

(b) introducing the oversaturated solution into a nucleation chamber comprising an agitation means, being positioned inside, and in open connection with a vessel;

(c) maintaining essentially homogeneous oversaturation of the oversaturated solution in the nucleation chamber during formation of precipitate; and (d) discharging the precipitate into the vessel after a predetermined period of time, wherein substantially a single polymorph of the organic molecule is obtained.

2. The method according to claim 1 in which the agitation means is a stirring means.

3. The method according claim 1 in which the nucleation chamber, the vessel, or both is provided with a temperature control means.

4. The method according to claim 1 further comprising introducing a non-solvent for the organic molecule to be precipitated into the nucleation chamber.

5. The method according to claim 1 in which the organic molecule to be precipitated is synthesized by chemical reaction in the nucleation chamber.

6. The method according to claim 5 in which the chemical reaction is the formation of a covalent or ionic bond, the protonation or deprotonation of a molecule, anion/cation exchange, acid addition salt formation or liberation, or any combination thereof.

7. The method according to claim 1, said method further comprising adding pre-nucleated crystals comprising the organic molecule to be precipitated to aid precipitation.

8. The method according to claim 4, said method further comprising adding pre-nucleated crystals comprising the organic molecule to be precipitated to aid precipitation.

9. The method according to claim 5, said method further comprising adding pre-nucleated crystals comprising the organic molecule to be precipitated to aid precipitation.

10. The method according to claim 3, said method further comprising a growth stage in which crystals of the precipitated organic molecules are further grown by adjusting the temperature of the vessel.

11. The method according to claim 1, in which the size of the organic molecule to be precipitated is controlled by adjusting temperature, pH, solvent, ionic strength, flow of the of the organic molecule to be precipitated, concentration of the organic molecule to be precipitated, agitation speed, agitation direction, size of the mixing chamber, or combinations thereof.

* * * * *